(12) United States Patent
Rivera et al.

(10) Patent No.: US 11,662,943 B2
(45) Date of Patent: May 30, 2023

(54) ADJUSTABLE MEDIA MANAGEMENT

(71) Applicant: Micron Technology, Inc., Boise, ID (US)

(72) Inventors: Benjamin Rivera, Boise, ID (US); Nicolas Soberanes, Boise, ID (US); Avani F. Trivedi, Boise, ID (US); Joseph A. De La Cerda, Boise, ID (US); Bruce J. Ford, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 253 days.

(21) Appl. No.: 16/902,845

(22) Filed: Jun. 16, 2020

(65) Prior Publication Data

US 2021/0389908 A1 Dec. 16, 2021

(51) Int. Cl.
*G06F 3/06* (2006.01)
*G06F 11/07* (2006.01)

(52) U.S. Cl.
CPC .......... *G06F 3/0659* (2013.01); *G06F 3/0613* (2013.01); *G06F 3/0673* (2013.01); *G06F 11/0727* (2013.01); *G06F 11/0751* (2013.01); *G06F 11/0793* (2013.01)

(58) Field of Classification Search
CPC .... G06F 3/0659; G06F 3/0613; G06F 3/0679; G06F 11/0727; G06F 11/0751; G06F 11/0793
USPC .......................................................... 711/172
See application file for complete search history.

(56) References Cited

U.S. PATENT DOCUMENTS

| | | | | |
|---|---|---|---|---|
| 10,175,892 B1* | 1/2019 | Kim | .................... | G06F 12/0246 |
| 10,180,797 B2* | 1/2019 | Grimsrud | ............. | G06F 12/0246 |
| 10,713,162 B1* | 7/2020 | Ben-Yehuda | ........ | G06F 12/0246 |
| 11,003,580 B1* | 5/2021 | Goss | .................... | G06F 12/0246 |
| 11,016,889 B1* | 5/2021 | Benjamin | ............... | G06F 12/10 |
| 11,106,390 B1* | 8/2021 | Goss | .................... | G06F 12/0868 |
| 2010/0122148 A1* | 5/2010 | Flynn | .................. | G11C 16/3422 |
| | | | | 714/E11.034 |
| 2010/0287217 A1* | 11/2010 | Borchers | ............. | G06F 12/0246 |
| | | | | 711/E12.008 |
| 2011/0107050 A1* | 5/2011 | Vengerov | ............. | G06F 12/0269 |
| | | | | 711/170 |
| 2015/0205664 A1* | 7/2015 | Janik | ................... | G06F 11/1012 |
| | | | | 714/764 |
| 2018/0260136 A1* | 9/2018 | Huo | ...................... | G06F 3/0685 |
| 2020/0133843 A1* | 4/2020 | Muchherla | .......... | G06F 12/0246 |
| 2020/0210330 A1* | 7/2020 | Muchherla | .......... | G06F 12/0238 |

(Continued)

*Primary Examiner* — Christopher B Shin
(74) *Attorney, Agent, or Firm* — Holland & Hart LLP

(57) ABSTRACT

Methods, systems, and devices for adjustable media management are described. A media management operation may be performed at a first rate. During the media management operation, invalid data may be moved from a first block of memory cells to a second block of memory cells at the first rate to free space in the first block. Based on one or more conditions of the memory device, the rate that the media management operation is performed may be adjusted to a second rate. For example, the rate may be lowered based on a quantity of access operations performed on the memory device. Invalid data may continue to be moved from the first block of memory cells to the second block of memory cells at the second rate.

25 Claims, 9 Drawing Sheets

(56) References Cited

U.S. PATENT DOCUMENTS

2020/0394133 A1* 12/2020 Carpenter ............. G06F 3/0608
2021/0279188 A1* 9/2021 Goss ................... G06F 13/1668

* cited by examiner

ADJUSTABLE MEDIA MANAGEMENT

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
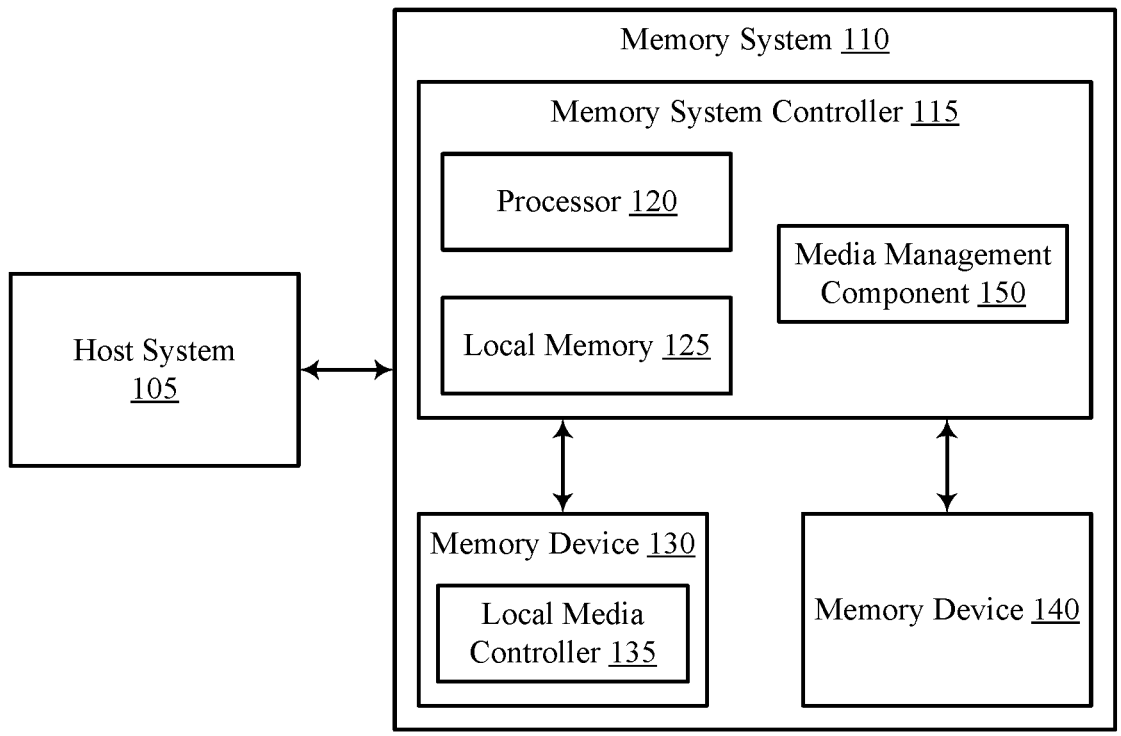
FIG. 1 illustrates an example of a computing system that supports adjustable media management in accordance with examples as disclosed herein.

A memory device may perform operations for media management algorithms, such as wear leveling operations, refresh operations, garbage collection operations, or scrub operations, among others. The memory device may include an array of memory cells that may be divided into one or more blocks. A block of memory cells may have some pages containing valid data and some pages containing invalid data. To avoid waiting for all of the pages in the block to have invalid data to erase and reuse the block, an algorithm hereinafter that may be referred to as "media management" or "garbage collection" may be invoked to allow the block to be erased and released as a free block for subsequent write operations. Garbage collection may be a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

During other different garbage collection operations, blocks are selected and undergo garbage collection at a static (e.g., predetermined, preconfigured) rate. Because a memory cell is accessed during a media management operation, and because a memory cell has a finite lifecycle based on a quantity of access operations, the static rate may be designed to balance performance and the lifecycle of the memory device. However, if the rate of performing media management operations is chosen to be relatively high, the memory device may experience high performance but a relatively short lifecycle. Conversely, if the rate of performing media management operations is chosen to be relatively low, the memory device may experience low performance but a relatively long lifecycle. Accordingly, a memory device having a dynamic (e.g., a variable) rate of performing media management operations may be improve memory device performance and lifecycle.

A memory device for performing media management operations at a dynamic rate is described herein. Such a memory device may include one or more components configured to track the overall "health" (e.g., various operating parameters such as a quantity of program or erase cycles, type of memory cells implemented by the memory device, etc.) of the memory device. Based on the health of the memory device, the rate at which media management operations are performed may be adjusted. For example, the memory device may be configured to monitor a quantity of access operations (e.g., read operations, write operations, media management operations) performed. Based on the quantity satisfying a threshold value, the rate of the media management operations may be adjusted. Additionally, or alternatively, the memory device may perform media management operations according to a dynamic rate as a function of the quantity of access operations performed on the memory device (e.g., a linear, exponential, step, piece-wise, or other function based on the quantity of access operations). Dynamically adjusting the rate over time may allow for the memory device to perform media management operations relatively aggressively (e.g., quickly) during the initial phase of a memory device to maximize performance. As the memory device ages, the rate may be scaled to prolong its lifecycle.

Features of the disclosure are initially described in the context of memory systems and dies as described with reference to FIGS. 1 and 2. Features of the disclosure are described in the context of timing diagrams and a process flow diagram as described with reference to FIGS. 3A, 3B, and 4. These and other features of the disclosure are further illustrated by and described with reference to an apparatus diagram and flowcharts that relate to adjustable media management as described with reference to FIGS. 5-9.

FIG. 1 an example of a computing environment 100 that includes a memory system 110 in accordance with some examples of the present disclosure. The memory system 110 may include media, such as one or more volatile memory devices (e.g., memory device 140), one or more non-volatile memory devices (e.g., memory device 130), or a combination of such.

A memory system 110 may be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 may include a host system 105 that is coupled to one or more memory systems or sub-systems 110. In some examples, the host system 105 is coupled to different types of memory systems 110. FIG. 1 illustrates one example of a host system 105 coupled to one memory system 110. The host system 105 uses the memory system 110, for example, to write data to the memory system 110 and read data from the memory system 110. As used herein, "coupled to" or "coupled with" generally refers to a connection between components or devices, which may be an indirect communicative connection or direct communicative connection (e.g., without intervening components or devices), whether wired or wireless, including connections such as electrical, optical, magnetic, etc.

The host system 105 may be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes a memory and a processing device. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface may be used to transmit data between the host system 105 and the memory system 110. The host system 105 may further utilize an NVM Express (NVMe) interface to access the memory components (e.g., memory devices 130) when the memory system 110 is coupled with the host system 105 by the PCIe interface. The physical host interface may provide an interface for passing control, address, data, and other signals between the memory system 110 and the host system 105.

The memory devices may include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory may perform bit storage based on a change of bulk resistance, in conjunction with a stackable cross-gridded data access array. Additionally, in contrast to many flash-based memories, cross-point non-volatile memory may perform a write in-place operation, where a non-volatile memory cell may be programmed without the non-volatile memory cell being previously erased.

Although non-volatile memory components such as 3D cross-point type memory and NAND type are described, the memory device 130 may be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) may store one bit per cell. Other types of memory cells, such as multi-level cells (MLCs), triple level cells (TLCs), and quad-level cells (QLCs), may store multiple bits per cell. In some examples, each of the memory devices 130 may include one or more arrays of memory cells such as SLCs, MLCs, TLCs, QLCs, or any combination of such. In some examples, a particular memory device may include an SLC portion, and an MLC portion, a TLC portion, or a QLC portion of memory cells. The memory cells of the memory devices 130 may be grouped as pages or codewords that may refer to a logical unit of the memory device used to store data. With some types of memory (e.g., NAND), pages may be grouped to form blocks. Some types of memory, such as 3D cross-point, may group pages across dice and channels to form management units (MUs).

The memory sub-system controller 115 (or controller 115 for simplicity) may communicate with the memory devices 130 to perform operations such as reading data, writing data, or erasing data at the memory devices 130 and other such operations. The memory sub-system controller 115 may include hardware such as one or more integrated circuits and/or discrete components, a buffer memory, or a combination of such. The hardware may include a digital circuitry with dedicated (i.e., hard-coded) logic to perform the operations described herein. The memory sub-system controller 115 may be a microcontroller, special purpose logic circuitry (e.g., a field programmable gate array (FPGA), an application specific integrated circuit (ASIC), etc.), or other suitable processor.

The memory sub-system controller 115 may include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory system 110, including handling communications between the memory system 110 and the host system 105.

In some examples, the local memory 125 may include memory registers storing memory pointers, fetched data, etc. The local memory 125 may also include read-only memory (ROM) for storing micro-code. While the example memory system 110 in FIG. 1 has been illustrated as including the memory sub-system controller 115, in another example of the present disclosure, a memory system 110 cannot include a memory sub-system controller 115, and may instead rely upon external control (e.g., provided by an external host, or by a processor or controller separate from the memory sub-system).

In general, the memory sub-system controller 115 may receive commands or operations from the host system 105 and may convert the commands or operations into instructions or appropriate commands to achieve the desired access to the memory devices 130. The memory sub-system controller 115 may be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 may further include host interface circuitry to communicate with the host system 105 via the physical host interface. The host interface circuitry may convert the commands received from the host system into command instructions to access the memory devices 130 as well as convert responses associated with the memory devices 130 into information for the host system 105.

The memory system 110 may also include additional circuitry or components that are not illustrated. In some examples, the memory system 110 may include a cache or buffer (e.g., DRAM) and address circuitry (e.g., a row decoder and a column decoder) that may receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) may externally manage the memory device 130 (e.g., perform media management operations on the memory device 130). In some examples, the memory devices 130 may be locally managed memory devices, which is a raw memory device combined with a local media controller 135 that performs memory management operations on the memory device 130 within the same memory device package.

The memory system 110 includes a media management component 150 that may perform a media management operation on the memory device 140 and/or adjust the rate at media management operations are performed on the memory device 140. In some examples, the rate of the media management operation may be adjusted based on one or more criteria (e.g., performance criteria) as determined by the media management component 150. For example, the media management component 150 may determine to perform a garbage collection operation more aggressively (e.g., faster) during the early stages of the memory device 140 and may less aggressively (e.g., slower) during the later stages of the memory device 140. Adjusting the rate of the garbage collection operation in such a manner may enable relatively high performance during the early stages of the memory device 140, while prolonging its lifecycle.

In some examples, the memory sub-system controller 115 includes at least a portion of the media management component 150. For example, the memory sub-system controller 115 can include a processor 120 (e.g., a processing device) configured to execute instructions stored in local memory 125 for performing the operations described herein. In some examples, the media management component 150 is part of the host system 105, an application, or an operating system. Further details with regards to the operations of the media management component 150 are described below.

Figure 2:
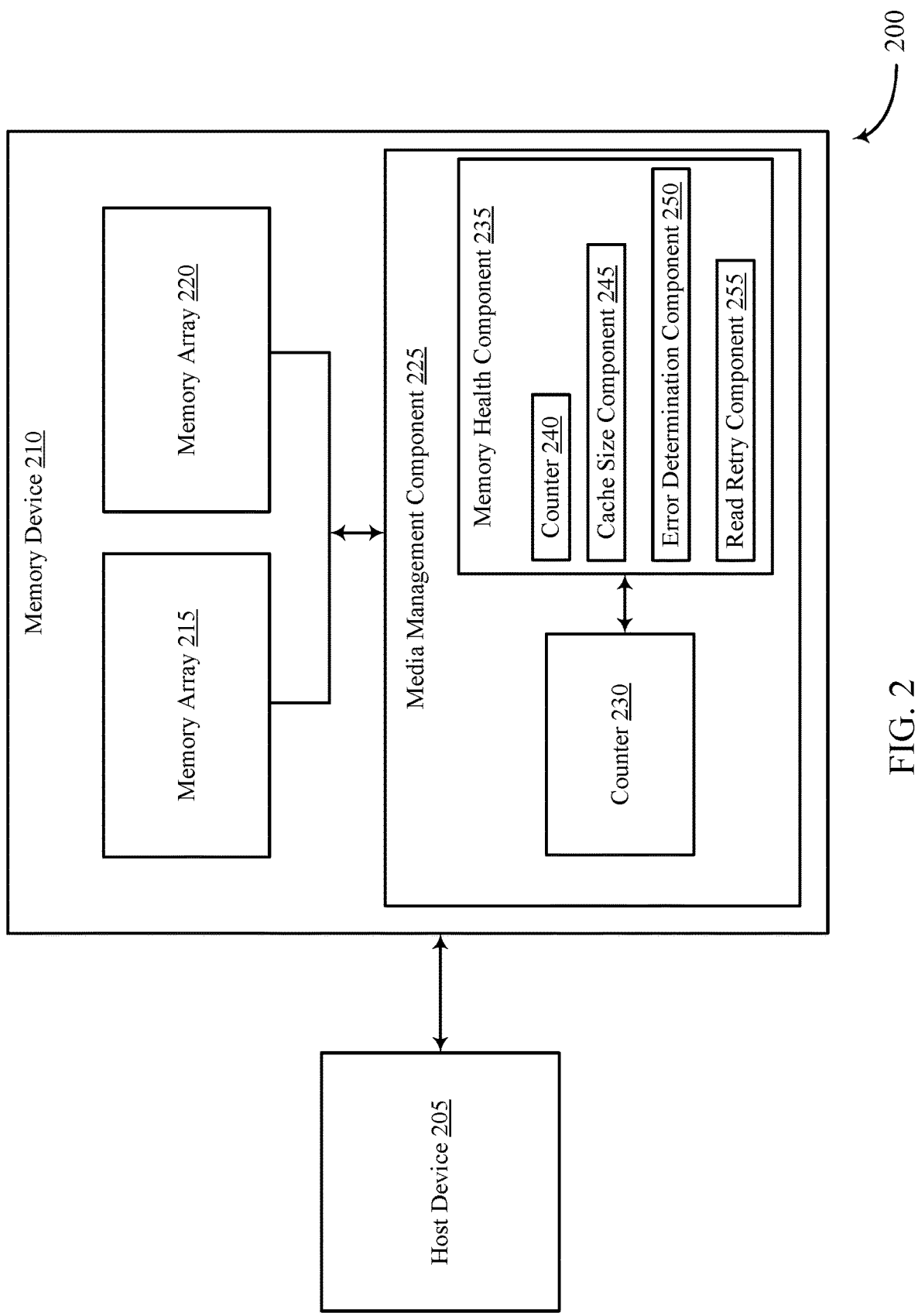
FIG. 2 illustrates an example of a memory system that supports adjustable media management in accordance with examples as disclosed herein.

FIG. 2 illustrates an example of a memory system 200 that supports adjustable media management in accordance with examples as disclosed herein. The memory system 200 may include a host device 205 that is coupled with (e.g., in communication with) a memory device 210. The memory device 210 may include a memory array 215 (e.g., a first memory array, a first block of memory cells) and a memory array 220 (e.g., a second memory array, a second block of memory cells). The memory array 215 and the memory array 220 may be coupled with a media management component 225 that is configured to perform media management operations (e.g., garbage collection operations) on the memory arrays. In some examples, the media management component 225 may be an example of the media management component 150 as described with reference to FIG. 1 and may include a counter 230 and a memory health component 235. The memory health component 235 may include one or more sub-components, such as a counter 240, a cache size component 245, an error determination component 250, and a read-retry component 255. The media management component 225 may be configured to adjust a rate at which media management operations are performed, which may improve the rate dirty (e.g., stale) data is removed, while extending the lifecycle of the memory device 210.

The host device 205 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples.

A memory device 210 may be an independent device or a component that is operable to provide physical memory addresses/space that may be used or referenced by the system 200. In some examples, a memory device 210 may be configurable to work with one or more different types of host devices 205. Signaling between the host device 205 and the memory device 210 may be operable to support one or more of: modulation schemes to modulate the signals, various pin configurations for communicating the signals, various form factors for physical packaging of the host device 205 and the memory device 210, clock signaling and synchronization between the host device 205 and the memory device 210, timing conventions, or other factors.

The memory device 210 may be operable to store data for the components of the host device 205. In some examples, the memory device 210 may act as a slave-type device to the host device 205 (e.g., responding to and executing commands provided by the host device 205). Such commands may include one or more of a write command for a write operation, a read command for a read operation, a refresh command for a refresh operation, or other commands. In some examples, the host device 205 may be configured to initiate a media management operation, such as a garbage collection operation.

The memory device 210 may include one or more memory arrays, such as a memory array 215 and a memory array 220. In some examples, the memory array 215 may include one or more memory cells, such as one or more NAND memory cells. The memory cells of the memory array 215 may be single level cells (SLCs) or multi-level cells (MLCs such as tri-level cells (TLCs), quad-level cells (QLCs), etc.).

In some examples, the memory array 215 may include one or more SLCs for storing data associated with access commands received from the host device 205. For example, the host device 205 may transmit a write command to the memory device 210, and associated data may be written to one or more memory cells of the memory array 215. Additionally or alternatively, the host device 205 may transmit a read command to the memory device 210, and associated data may be read from one or more memory cells of the memory array 215. Data may be read from or written to SLCs at relatively fast speeds (e.g., fast write speeds) compared to MLCs. Accordingly, including one or more SLCs in the memory array 215 may improve the overall performance of the memory device 210.

Additionally or alternatively, the memory array 220 may include one or more MLCs for storing data moved from the memory array 215 during a media management operation.

For example, during a garbage collection operation, invalid data may be read from one or more SLCs of the memory array 215, written to one or more MLCs of the memory array 220, and erased from the respective SLCs. Because MLCs may provide more efficient storage than SLCs, including one or more MLCs in the memory array 220 may improve the storage capabilities of the memory device 210.

In some instances, data stored to the memory array 215 may become invalid. For example, a page of data may be written to the memory array 215 during an initial write operation. At a later time, data associated with the same page may be written to memory array 215, which may render the initial data (e.g., the data associated with the initial write operation) invalid. In such instances, it may be beneficial to perform a media management operation, such as a garbage collection operation, to remove the invalid data from the memory array 215 to make the associated memory cell(s) available for subsequent write operations. The valid data may be moved to the memory array 220, which may increase an available quantity of memory cells of the memory array 215. As discussed herein, the memory device 210 may be configured to perform a media management operation at a variable rate, which may maximize the rate at which memory cells of the memory array 215 are made available, while prolonging the lifecycle of the memory device 210.

The memory array 220 may include one or more memory cells, such as one or more NAND memory cells. The memory cells of the memory array 220 may MLCs, such as TLCs or QLCs. During a garbage collection operation, invalid data may be copied from the memory array 215 to the memory array 220. Because invalid data may be stored to the memory array 220 indefinitely (e.g., for the lifecycle of the memory device 210), the memory cells of the memory array 220 may have higher storage capacity (relative to the memory cells of the memory array 215) to store a relatively large quantity of invalid data.

The media management component 225 may be configured to perform a media management operation on the memory array 215 and/or adjust the rate at which a media management operation is being performed. A media management operation may be initiated and/or adjusted based on one or more commands (e.g., a command received from the host device 205). In some examples, the rate of the media management operation may be adjusted based on one or more criteria (e.g., performance criteria) as determined by the media management component 225. For example, the media management component 225 may determine to perform a garbage collection operation more aggressively (e.g., faster) during the early stages of the memory device 210 and may less aggressively (e.g., slower) during the later stages of the memory device 210. Adjusting the rate of the garbage collection operation in such a manner may enable relatively high performance during the early stages of the memory device 210, while prolonging its lifecycle.

The media management component 225 may include a counter 230 that is configured to determine (e.g., track) a duration that the memory device 210 is idle. In some examples, the memory device 210 may be in an idle state based on an absence of commands (e.g., access commands) received from the host device 205. For example, the memory device 210 may be in an idle state when one or more commands are not received for a threshold duration. Accordingly, the counter 230 may be initiated when a command is received from the host device 205 and may track (e.g., count) the time until the next command is received. When the memory device 210 does not receive a command from the host device 205 for a threshold duration, garbage collection may not need to be performed as aggressively (e.g., as quickly). Accordingly, based on a duration that the memory device 210 is idle, the rate at which a media management operation is performed may be adjusted.

The media management component 225 may include a memory health component 235 that is configured to identify certain conditions of the memory device 210 that may allow for the rate of the media management operation to be adjusted. For example, the memory health component 235 may include a counter 240 for tracking a quantity of access operations performed on the memory array 215, a cache size component 245 for determining a quantity of available memory cells (of the memory array 215 or the memory array 220), an error determination component 250 for determining a quantity of errors associated with data of the memory array 215 or the memory array 220, and a read-retry component 255 for determining an error associated with a read operation and performing a subsequent read (e.g., a re-read). Based on the conditions of the memory device 210 identified by the sub-components of the memory health component 235, a rate of a media management operation performed on the memory device 210 may be adjusted.

As discussed herein, the memory health component 235 may include a counter 240 configured to track a quantity operations performed on the memory device 210. For example, the counter 240 may be incremented each time a program or erase operation is performed on the memory array 215, the memory array 220, or both. As discussed herein, operations such as program operations, erase operations, read operations, write operations, and/or media management operations may be collectively referred to as access operations. The rate at which a media management operation is performed may be adjusted based on the value of the counter 240 satisfying a threshold quantity. For example, it may be desirable to adjust (e.g., reduce) the rate based on the memory device 210 undergoing a relatively large quantity of access operations and/or media management operations.

In some examples, the counter 240 may be reset periodically so that the quantity of operations performed on the memory device 210 are tracked over a duration. For example, it may be beneficial to adjust the rate based on the memory device 210 undergoing a relatively large quantity of access operations over a certain duration. The threshold value of the counter 240 and/or the duration at which the counter 240 is reset may be configurable based on various design considerations of the memory device 210.

The memory health component 235 may include a cache size component 245 configured to determine a quantity of available memory cells of the memory array 215 and/or the memory array 220. For example, the cache size component 245 may periodically assess how many memory cells (pages of memory cells, blocks of memory cells, etc.) of the memory array 215 and/or the memory array 220 are available. When assessing the memory array 215, the cache size component 245 may indicate (e.g., to the memory health component 235 and/or the media management component 225) when a quantity of available memory cells satisfies a threshold value or when a quantity of unavailable memory cells falls below a threshold value.

In some examples, when the quantity of available memory cells satisfies a threshold value, the memory array 215 may contain a satisfactory quantity of available memory cells, and the rate at which a media management operation is performed may be adjusted (e.g., decreased). Additionally or alternatively, when the quantity of unavailable memory cells falls below a threshold value, the memory array 215 may contain an unsatisfactory quantity of available memory cells, and the rate at which a media management operation is performed may be adjusted (e.g., increased).

In other examples, when assessing the memory array 220, the cache size component 245 may indicate (e.g., to the memory health component 235 and/or the media management component 225) when a quantity of available memory cells satisfies a threshold value or when a quantity of unavailable memory cells falls below a threshold value. For example, when the quantity of available memory cells satisfies a threshold value, the memory array 220 may contain a satisfactory quantity of available memory cells, and the rate at which a media management operation is performed may be adjusted (or may remain the same). Additionally or alternatively, when the quantity of unavailable memory cells falls below a threshold value, the memory array 220 may contain an unsatisfactory quantity of available memory cells, and the rate at which a media management operation is performed may be adjusted (e.g., decreased).

When assessing a quantity of available memory cells of the memory array 215 and/or the memory array 220, the cache size component may consider the quantity of available memory cells of each memory array when determining whether to adjust the rate of a media management operation.

The memory health component 235 may include an error determination component 250 configured determine a quantity of errors associated with data of the memory array 215 and/or the memory array 220. For example, when data is read from the memory array 215, the error determination component 250 may determine whether the data includes any errors. The error determination component 250 may track the quantity of errors and, upon a threshold quantity of errors occurring, may initiate adjusting a rate of a media management operation.

In another example, when data (e.g., invalid data) is written to the memory array 220, the error determination component 250 may determine whether the data includes any errors. The error determination component 250 may track the quantity of errors and, upon a threshold quantity of errors occurring, may initiate adjusting a rate of a media management operation. For example, the rate may be decreased when a relatively large quantity of errors associated with either the memory array 215 or the memory array 220 are detected.

The memory health component 235 may include a read-retry component 255 configured to perform a read-retry operation. A read-retry operation may refer to an operation where data is read from the memory array 215. Upon reading the data, an error may be detected (e.g., by the read-retry component 255 and/or the error determination component 250) and the data may be read again (e.g., re-read from the memory array 215). In some examples, re-reading the data may resolve any errors that occurred during the initial read operation. An occurrence of read-retry operations may be tracked and, in some examples, may result in a rate of a media management operation being adjusted. For example, when a threshold quantity of read-retry operations are performed, the rate at which a media management operation is performed may be adjusted (e.g., decreased).

The sub-components of the memory health component 235 described herein may be performed by a single component (e.g., a memory controller) or individual components as described. The operations of each of the components may be performed in series or in parallel, and any one operation may result in the rate of a media management operation being adjusted. For example, the rate may be adjusted (e.g., from a first rate to a second rate) based on the operation of a first component, and may be further-adjusted (e.g., from the second rate to a third rate) based on the operation of a second (e.g., a different component).

Figure 3A:
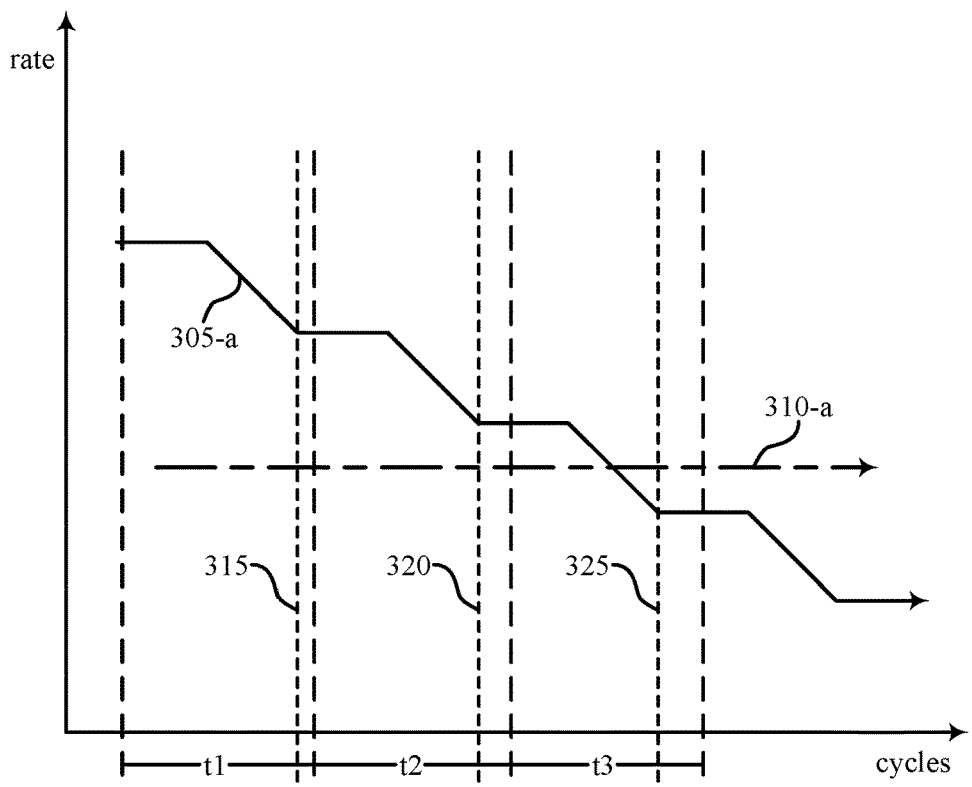
FIGS. 3A and 3B illustrate example timing diagrams that support adjustable media management in accordance with examples as disclosed herein.

FIG. 3A illustrates an example of a timing diagram 300-a that supports adjustable media management in accordance with examples as disclosed herein. The timing diagram 300-a may illustrate dynamically adjusting a rate 305-a at which a media management operation is performed. For example, the timing diagram 300-a may illustrate the results from the memory health component 235 (or one or more sub-components of the memory health component 235) adjusting the rate of a media management operation as described with reference to FIG. 2. The timing diagram 300-a may illustrate the rate 305-a being adjusted incrementally (e.g., as a step function) based on a quantity of access operations performed on the associated memory device. The timing diagram 300-a may also illustrate the rate 305-b being adjusted continuously (e.g., as a piecewise function) at one or more instances based on a quantity of access operations performed on the associated memory device.

The timing diagram 300-a may illustrate the rate 305-a being adjusted incrementally relative to a static rate 310-a of performing a media management operation. By adjusting the rate 305-a incrementally (e.g., dynamically), the overall performance of the memory device may be improved, while prolonging its lifecycle. Although the timing diagram 300-a illustrates the rate 305-a being adjusted incrementally based on a quantity of access operations, the rate 305-a may be adjusted in any manner and based on a variety of characteristics of an associated memory device as described herein.

During t1, a memory device (e.g., a memory device 210 as described with reference to FIG. 2) may perform a media management operation at a first rate. The first rate may last for a duration, and may be preconfigured (e.g., set to an initial rate setting) or may be based on one or more conditions of the memory device as described with reference to FIG. 2. The first rate may be relatively high, and may represent a memory device that has experienced relatively few access operations such as program operations, erase operations, or program/erase cycles, or any combination thereof. By performing media management operations at a relatively high rate when the memory device has experienced relatively few access operations, the overall performance of the memory device may be improved.

At a time during t1, the rate 305-a of the media management operation may be adjusted from the first rate to a second rate (e.g., an intermediate rate). For example, the memory device may undergo a threshold quantity (e.g., 250, 500, or a threshold percentage of a total number of access operations supported by the memory device (e.g., 10% of the total number)) of access operations 315 (e.g., program operations, erase operations, program/erase cycles) and the rate may be adjusted downward accordingly. In some examples, the rate 305-a may be adjusted based on other conditions described with reference to FIG. 2. In some examples, the rate 305-a may be decreased to minimize the quantity of times any one memory cell is accessed. Because a memory cell is accessed during a media management operation, and because a memory cell has a finite lifecycle based on a quantity of access operations, reducing the rate 305-a that a media management operation is performed may prolong the lifecycle of the associated memory device.

During t2, the memory device (e.g., a memory device 210 as described with reference to FIG. 2) may continue performing the media management operation at the first rate for a duration. As discussed herein, the second rate may be lower (e.g., slower) than the first rate, and may prolong the lifecycle of the memory device. At a time during t2, the rate 305-a of the media management operation may be adjusted from the second rate to a third rate (e.g., a rate lower than the first rate and the second rate). For example, the memory device may undergo a threshold quantity (e.g., 750, 1000, 1250, or a threshold percentage of a total number of access operations supported by the memory device (e.g., 25% of the total number)) of access operations 320 (e.g., program operations, erase operations, program/erase cycles) and the rate may be adjusted downward accordingly.

The rate 305-a may be adjusted based on a threshold quantity of access operations being satisfied, or based on other conditions described with reference to FIG. 2. In some examples, the rate 305-a may be decreased to minimize the quantity of times any one memory cell is accessed due to a media management operation. As discussed herein, reducing the rate 305-a based on a quantity of access operations performed on the memory device may prolong the lifecycle of the associated memory device.

During t3 (and during subsequent time intervals that are not shown), memory device may continue performing the media management operation at the third rate and/or may further-reduce the rate 305-a based on the quantity of access operations performed. For example, the memory device may undergo a threshold quantity (e.g., 2000, 2500, 3000, or a threshold percentage of a total number of access operations supported by the memory device (e.g., 50% of the total number)) of access operations 325 (e.g., program operations, erase operations) and the rate may be adjusted downward accordingly. The quantity of access operations illustrated in FIG. 3A may represent a quantity of access operations performed on a memory cell, a memory block, or a memory array. Additionally or alternatively, the duration that a memory array may perform media management operations at any one rate may be variable, and any of t1, t2, and/or t3 may last for a longer or shorter duration than illustrated.

Figure 3B:
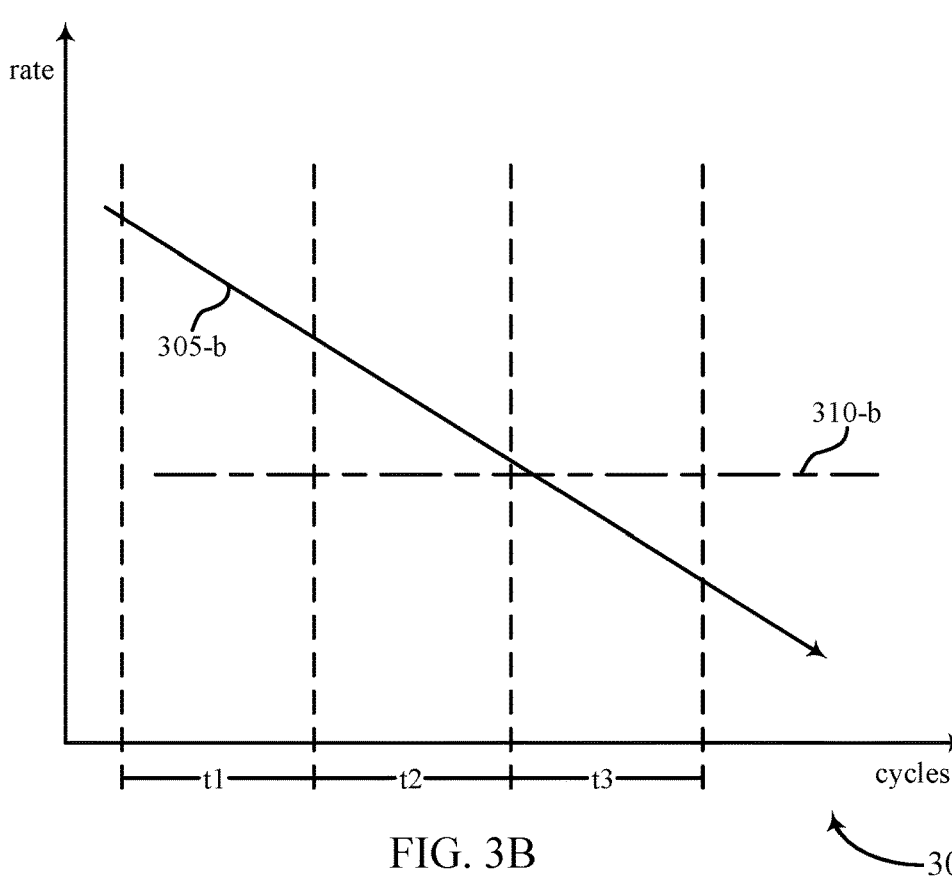

FIG. 3B illustrates an example of a timing diagram 300-b that supports adjustable media management in accordance with examples as disclosed herein. The timing diagram 300-b may illustrate adjusting an adjustable rate 305-b at which a media management operation is performed. For example, the timing diagram 300-b may illustrate the results from the memory health component 235 (or one or more sub-components of the memory health component 235) adjusting the rate of a media management operation as described with reference to FIG. 2. The timing diagram 300-b may illustrate the rate 305-b being adjusted continuously (e.g., as a piecewise function) based on a quantity of access operations performed on the associated memory device. Although the timing diagram 300-b illustrates the rate 305-b being adjusted continuously based on a quantity of access operations, the rate 305-b may be adjusted in any manner and based on a variety of characteristics of an associated memory device as described herein.

The timing diagram 300-b may illustrate the rate 305-b being adjusted continuously relative to a static rate 310-b of performing a media management operation. By adjusting the rate continuously (e.g., dynamically), the overall performance of the memory device may be improved, while prolonging its lifecycle. Although the timing diagram 300-b illustrates the rate 305-b being adjusted continuously based on a quantity of access operations, the rate 305-b may be adjusted in any manner and based on a variety of characteristics of an associated memory device as described herein.

During t1, a memory device (e.g., a memory device 210 as described with reference to FIG. 2) may begin performing a media management operation at a first rate (e.g., at a first decreasing rate). The first rate may be preconfigured (e.g., set to an initial rate setting) or may be based on one or more conditions of the memory device as described with reference to FIG. 2. The first rate may be relatively high, and may represent a memory device that has experienced relatively few access operations. By performing media management operations at a relatively high rate when the memory device has experienced relatively few access operations, the overall performance of the memory device may be improved.

During t1, the rate 305-b of the media management operation may be continually decreased based on a quantity of access operations performed on the associated memory device. In some examples, the memory device may be configured to continually track the quantity of access operations performed and adjust the rate 305-b of the media management operation continually. For example, the rate 305-b may be adjusted after each access operation, or after a threshold quantity of access operations is performed. Adjusting the rate 310-b may prolong the lifecycle of the associated memory device.

During t2, the memory device (e.g., a memory device 210 as described with reference to FIG. 2) may continue adjusting the rate of the media management operation downward (e.g., lower). The rate of the media management operation during t2 (e.g., a second decreasing rate) may be lower (e.g., slower) than the rate during t1 (e.g., the first rate), and may prolong the lifecycle of the memory device. In some examples, during t2, the rate at which the media management operation is decreasing may be different than during t1. For example, during t2, the rate at which the media management operation is performed may increase faster or slower relative to the rate during t1. The rate may be continually adjusted based on a threshold quantity of access operations being satisfied, or based on other conditions described with reference to FIG. 2. In some examples, the rate may be decreased to minimize the quantity of times any one memory cell is accessed due to a media management operation. As discussed herein, reducing the rate based on a quantity of access operations performed on the memory device may prolong the lifecycle of the associated memory device.

During t3 (and during subsequent time intervals that are not shown), memory device may continue adjusting the rate of the media management operation based on the quantity of access operations performed. The quantity of access operations illustrated in FIG. 3B may represent a quantity of access operations performed on a memory cell, a memory block, or a memory array. Additionally or alternatively, the rate and/or manner that the memory device adjusts the rate during any one time may vary. For example, the rate 310-b shown in FIG. 3B is for illustrative purposes only, and could instead be a curve (e.g., exponential decay, parabolic decay) or may be static until a threshold is reached, before again decreasing thereafter.

Figure 4:
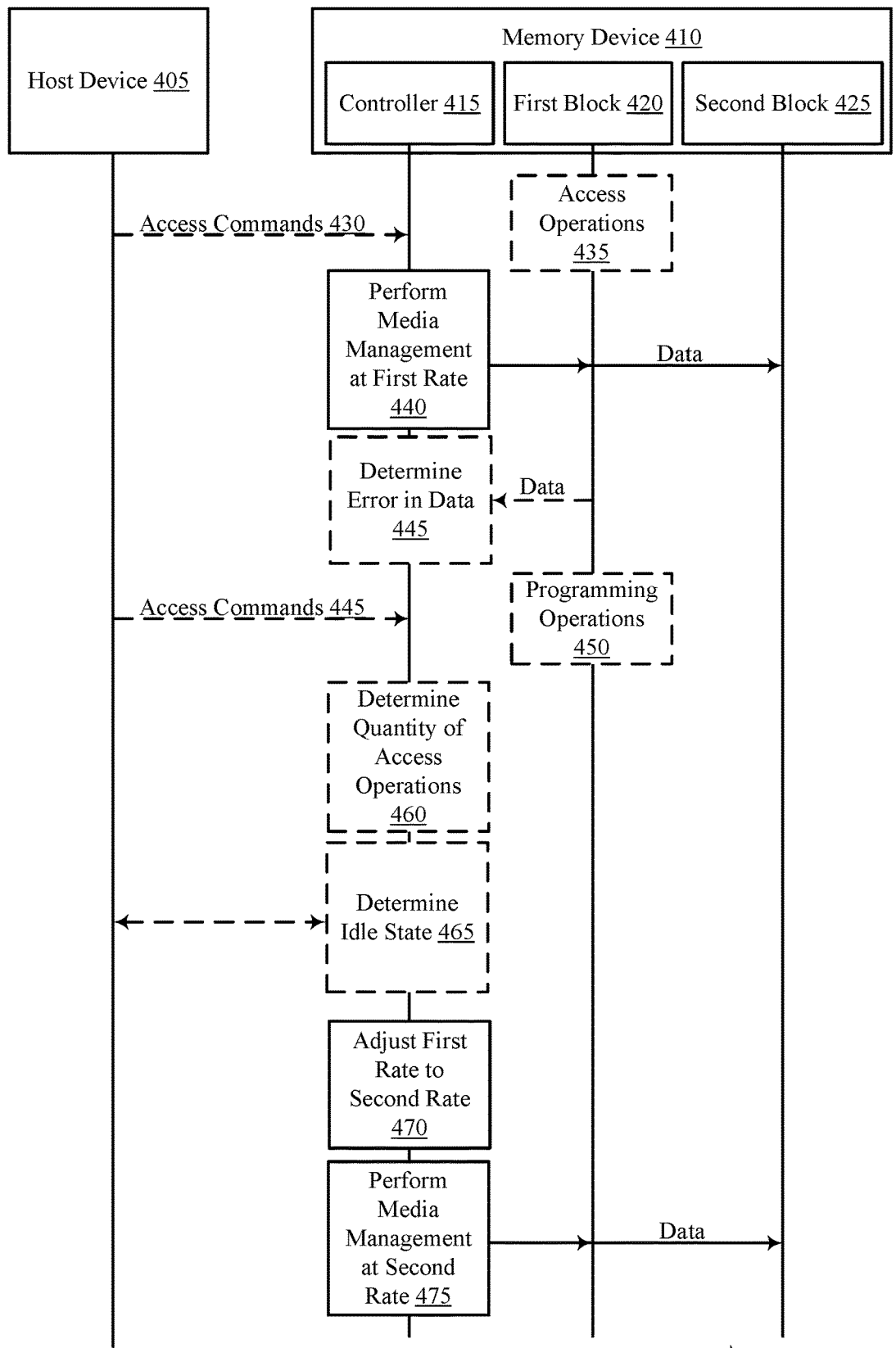
FIG. 4 illustrates an example process flow diagram that supports adjustable media management in accordance with examples as disclosed herein.

FIG. 4 illustrates an exemplary process flow diagram 400 that supports adjustable media management in accordance with examples as disclosed herein. The process flow diagram 400 illustrates an example of adjusting a rate of a media management operation from a first rate to a second rate as described with reference to FIGS. 2, 3A, and 3B. The media management operation may be performed on a memory device 410 that includes a controller 415, a first block 420 (e.g., a first block of memory cells), and a second block 425 (e.g., a second block of memory cells). The memory device 410 may be coupled with a host device 405. In some examples, the controller 415 may perform one or more operations associated with the media management component 225 as described with reference to FIG. 2.

At 430, the memory device 410 may optionally receive one or more access commands from the host device 405. The access commands may be for reading data from the first block 420 or writing data to the first block 420. For example, an access command may be for writing data to one or more SLCs of the first block 420.

At 435, one or more access operations associated with the access commands may be optionally performed on the first block 420. As described herein, the access commands may be for reading data from the first block 420 or writing data to the first block 420. For example, data may be written to one or more SLCs of the first block 420.

At 440, a media management operation may be performed at a first rate. As described herein, a media management operation (e.g., a garbage collection operation) may entail reading stale or invalid data from the first block 420 and writing the data to the second block 425. The data may be subsequently erased from the first block 420, thus freeing the associated memory cells for use in a subsequent write operation. The rate at which the media management operation is performed may refer to the rate at which memory cells (or groups of memory cells) are selected for the media management operation. For example, data may be read from at least one SLC of the first block 420, written to a MLC of the second block 425, and erased from the SLC(s) of the first block 420. Subsequent memory cells may be selected for a media management operation at the first rate.

At 445, errors in the data of the first block 420 and/or the second block 425 may be optionally determined. In some examples, when an access command is received (e.g., at 430) from the host device 405, data may be read from one or more memory cells of the first block 420. This data may contain errors, which may be identified at 445. In some examples, when an error (or multiple errors) is identified, the controller 415 may adjust the rate at which a media management operation is performed. Additionally or alternatively, errors may be introduced to data when it is written to the second block 425. When such an error is identified, the controller 415 may adjust the rate at which the media management operation is performed.

At 450, the memory device 410 may optionally receive one or more additional access commands from the host device 405. The access commands may be for reading data from the first block 420 or writing data to the first block 420. For example, an access command may be for writing data to one or more SLCs of the first block 420.

At 455, one or more additional access operations associated with the access commands may be optionally performed on the first block 420. As described herein, the access commands may be for reading data from the first block 420 or writing data to the first block 420. For example, data may be written to one or more SLCs of the first block 420.

At 460, the controller 415 may optionally determine a quantity of access commands performed on the memory device 410. As discussed herein, an access command may refer to a read command or a write command performed on the first block 420, or may refer to a media management operation performed on the first block 420 and the second block 425. Moreover, at 460, the controller 415 may determine a quantity of access commands performed at 425, 440, or 450. In some examples, if the quantity satisfies a threshold value, the rate at which the media management operation is performed may be adjusted.

At 465, the controller 415 may optionally determine whether the memory device 410 is operating in an idle state. An idle state may refer to a duration where the memory device 410 does not receive an access command from the host device 405. The duration that defines an idle state may be adjustable, and may be based on one or more design parameters of the memory device 410. In some examples, the rate at which the memory device 410 performs a media management operation may be adjusted based on the memory device 410 operating in an idle state.

At 470, the controller 415 may adjust the rate that the memory device 410 is performing a media management operation from a first rate to a second rate. In some examples, the second rate may be slower than the first rate. The adjustment may occur based on a variety of considerations discussed herein, such as a quantity of access operations, a quantity of errors associated with data of the first block 420 or the second block 425, and/or whether the memory device 410 is operating in an idle state. By adjusting the rate at which the memory device 410 performs media management operations, the its overall performance may be improved and its lifecycle may be prolonged.

At 475, a media management operation may be performed at a second rate (e.g., a different rate than the first rate). The media management operation (e.g., a garbage collection operation) may entail reading stale or invalid data from the first block 420 and writing the data to the second block 425. The data may be subsequently erased from the first block 420, thus freeing the associated memory cells for use in a subsequent write operation. For example, data may be read from at least one SLC of the first block 420, written to a MLC of the second block 425, and erased from the SLC(s) of the first block 420. Subsequent memory cells may be selected for a media management operation at the second rate.

Figure 5:
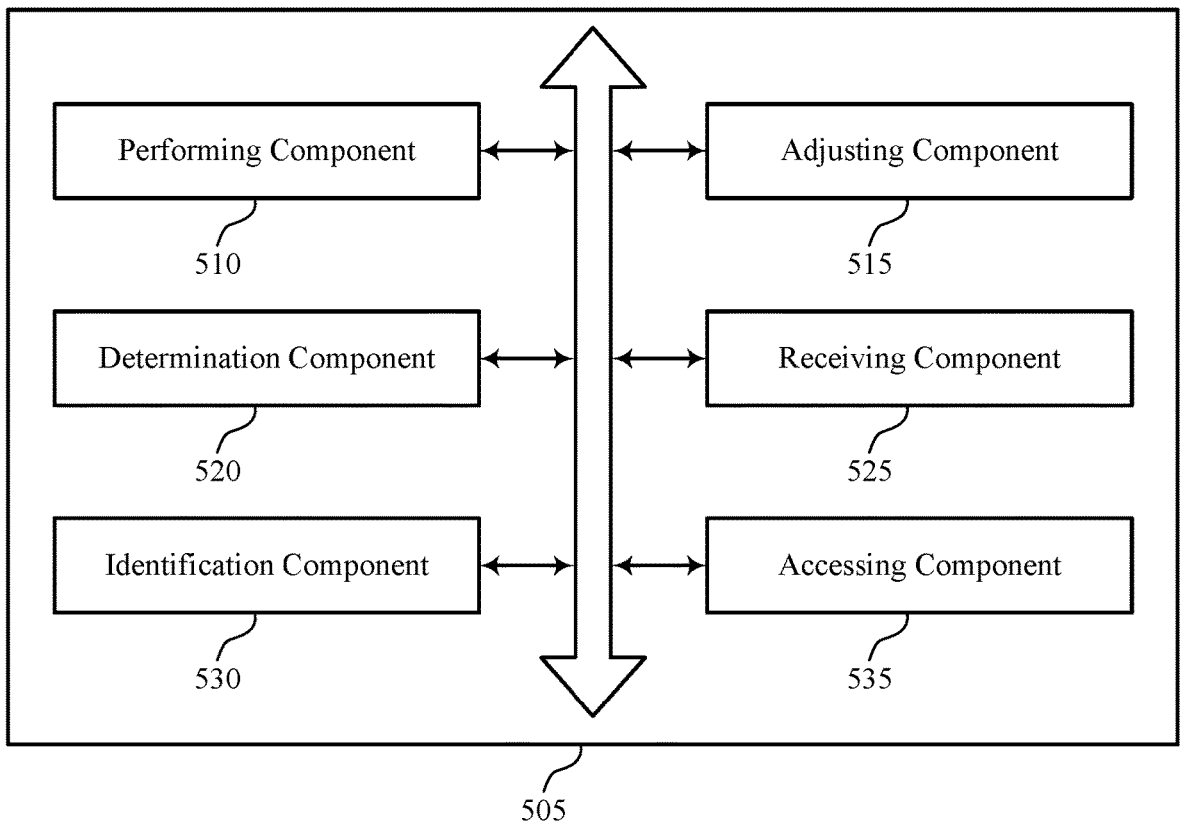
FIG. 5 shows a block diagram of a memory device that supports adjustable media management in accordance with aspects of the present disclosure.

FIG. 5 shows a block diagram 500 of a memory device 505 that supports adjustable media management in accordance with examples as disclosed herein. The memory device 505 may be an example of aspects of a memory device as described with reference to FIGS. 1 through 4. The memory device 505 may include a performing component 510, an adjusting component 515, a determination component 520, a receiving component 525, an identification component 530, and an accessing component 535. Each of these modules may communicate, directly or indirectly, with one another (e.g., via one or more buses).

The performing component 510 may perform according to a first rate, a media management operation on the first block of memory cells and the second block of memory cells. In some examples, the performing component 510 may perform the media management operation on the first block of memory cells and the second block of memory cells at the second rate based on adjusting the first rate to the second rate. In some examples, the performing component 510 may perform a set of access operations on memory cells of the first block of memory cells.

The adjusting component 515 may adjust the first rate to a second rate based on one or more programming operations performed on the first block of memory cells. In some examples, the adjusting component 515 may adjust a rate of a media management operation performed on data stored at the memory cells of the first block of memory cells from a first rate to a second rate based on the quantity of access operations satisfying a threshold value. In some examples, the adjusting component 515 may adjust the second rate of performing the media management operation to a third rate based on the second set of programming commands exceeding the second threshold value.

The determination component 520 may determine a quantity of access operations performed on the first block of memory cells based on initiating performing the set of access operations. In some examples, the determination component 520 may determine that a quantity of the programming operations performed on the first block of memory cells exceeds a threshold value, where the first rate is adjusted to the second rate after the quantity of programming operations exceeds the threshold value. In some examples, the determination component 520 may determine that at least the first block of memory cells is in an idle state based on an absence of commands for the first block of memory cells over a second duration, where adjusting the first rate of performing the media management operation to the second rate occurs based on at least the first block of memory cells operating in the idle state for a threshold duration.

In some examples, the determination component 520 may determine that a quantity of the second set of programming commands exceeds a second threshold value. In some examples, the determination component 520 may determine one or more errors associated with the first data based on receiving the first read command. In some examples, the determination component 520 may determine a quantity of write operations performed on at least the first block of memory cells.

In some examples, the determination component 520 may determine a quantity of available memory cells in the first block of memory cells based on identifying the size of the first block and determining the quantity of write operations performed on the first block, where adjusting the first rate of performing the media management operation to the second rate is based on the quantity of available memory cells in the first block. In some examples, the determination component 520 may determine a quantity of erase operations performed on at least the first block of memory cells, where adjusting the first rate of performing the media management operation to the second rate is based on the quantity of erase operations performed on the first block. In some examples, the determination component 520 may determine that an access operation has not been performed on any memory cells of the first block for a threshold duration, where adjusting the rate of the media management operation from the first rate to the second rate occurs based on the threshold duration being satisfied.

The receiving component 525 may receive a first set of programming commands for writing data to the first block of memory cells for a first duration. In some examples, the receiving component 525 may receive a second set of programming commands after adjusting the first rate of performing the media management operation to the second rate. In some examples, the receiving component 525 may receive a first read command for at least one memory cell of the first block of memory cells or the second block of memory cells when performing the media management operation at the first rate.

In some examples, the receiving component 525 may receive a second read command for the first data stored at the first block of memory cells based on determining the one or more errors associated with the first data. In some examples, the receiving component 525 may receive a read command for a first SLCs of the set of SLCs.

The identification component 530 may identify a size of the first block of memory cells.

The accessing component 535 may read, as part of the media management operation, the data stored at the memory cells of the first block of memory cells at the second rate based on adjusting the rate. In some examples, the accessing component 535 may write, as part of the media management operation, the data read from the first block of memory cells to the second block of memory cells at the second rate. In some examples, the accessing component 535 may read the first SLC based on receiving the read command. In some examples, the accessing component 535 may write data from the first SLC to a first TLC based on reading the first SLC. In some examples, the accessing component 535 may erase the first SLC based on writing the data from the first SLC to the first TLC.

In some examples, the accessing component 535 may read, as part of the media management operation, the data stored at the memory cells of the first block of memory cells at the first rate based on initiating performing the set of access operations. In some examples, the accessing component 535 may write, as part of the media management operation, the data read from the first block of memory cells to the second block of memory cells at the first rate before adjusting the rate of the media management operation from the first rate to the second rate. In some examples, the accessing component 535 may erase, as part of the media management operation, the data read from the first block of memory cells at the second rate based on writing the data to the second block of memory cells.

Figure 6:
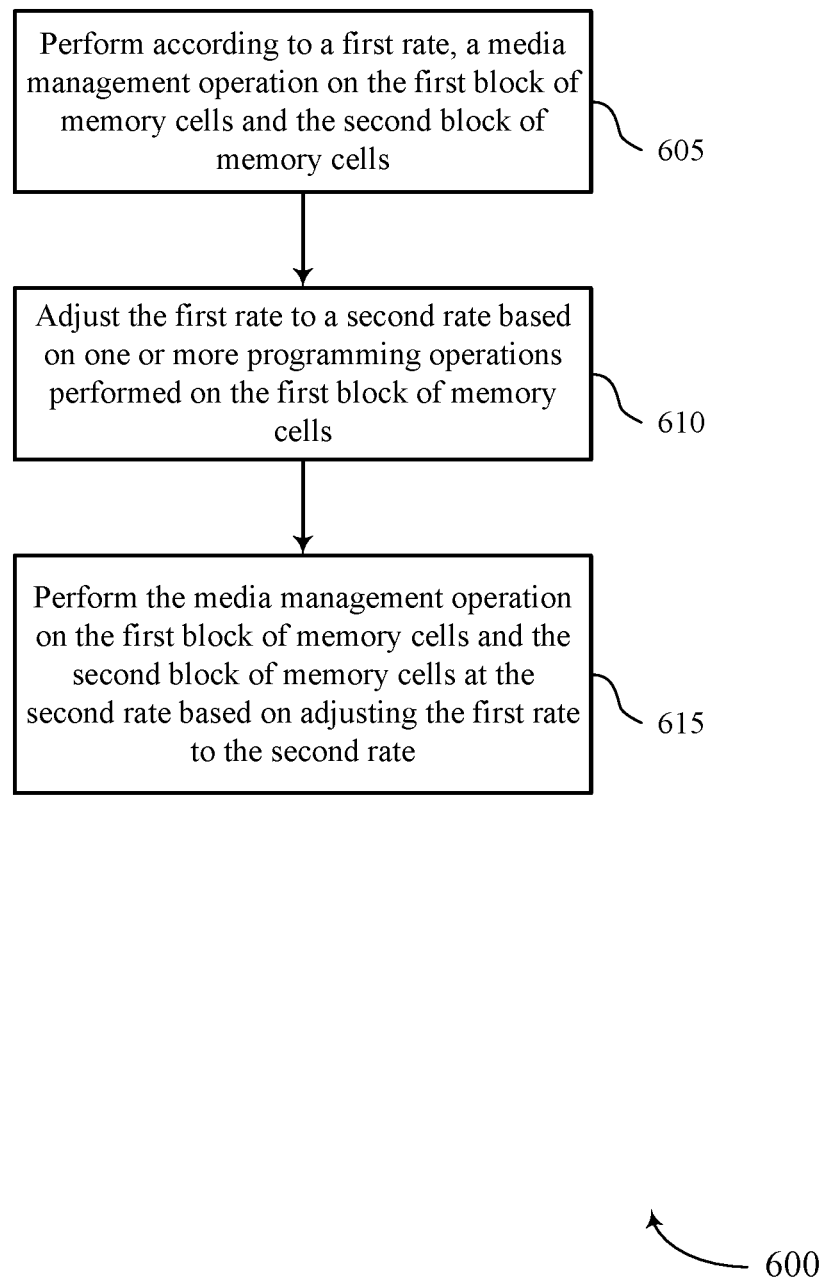
FIGS. 6 through 9 show flowcharts illustrating a method or methods that support adjustable media management in accordance with examples as disclosed herein.

FIG. 6 shows a flowchart illustrating a method or methods 600 that supports adjustable media management in accordance with aspects of the present disclosure. The operations of method 600 may be implemented by a memory device or its components as described herein. For example, the operations of method 600 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 605, the memory device may perform according to a first rate, a media management operation on the first block of memory cells and the second block of memory cells. The operations of 605 may be performed according to the methods described herein. In some examples, aspects of the operations of 605 may be performed by a performing component as described with reference to FIG. 5.

At 610, the memory device may adjust the first rate to a second rate based on one or more programming operations performed on the first block of memory cells. The operations of 610 may be performed according to the methods described herein. In some examples, aspects of the operations of 610 may be performed by an adjusting component as described with reference to FIG. 5.

At 615, the memory device may perform the media management operation on the first block of memory cells and the second block of memory cells at the second rate based on adjusting the first rate to the second rate. The operations of 615 may be performed according to the methods described herein. In some examples, aspects of the operations of 615 may be performed by a performing component as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for performing according to a first rate, a media management operation on the first block of memory cells and the second block of memory cells, adjusting the first rate to a second rate based on one or more programming operations performed on the first block of memory cells, and performing the media management operation on the first block of memory cells and the second block of memory cells at the second rate based on adjusting the first rate to the second rate.

Some examples of the method 600 and the apparatus described herein may further include operations, features, means, or instructions for determining that a quantity of the programming operations performed on the first block of memory cells exceeds a threshold value, where the first rate may be adjusted to the second rate after the quantity of programming operations exceeds the threshold value.

Some examples of the method 600 and the apparatus described herein may further include operations, features, means, or instructions for receiving a first set of programming commands for writing data to the first block of memory cells for a first duration, and determining that at least the first block of memory cells may be in an idle state based on an absence of commands for the first block of memory cells over a second duration, where adjusting the first rate of performing the media management operation to the second rate occurs based on at least the first block of memory cells operating in the idle state for a threshold duration.

Some examples of the method 600 and the apparatus described herein may further include operations, features, means, or instructions for receiving a second set of programming commands after adjusting the first rate of performing the media management operation to the second rate, determining that a quantity of the second set of programming commands exceeds a second threshold value, and adjusting the second rate of performing the media management operation to a third rate based on the second set of programming commands exceeding the second threshold value.

Some examples of the method 600 and the apparatus described herein may further include operations, features, means, or instructions for receiving a first read command for at least one memory cell of the first block of memory cells when performing the media management operation at the first rate, determining one or more errors associated with the first data based on receiving the first read command, and receiving a second read command for the first data stored at the first block of memory cells based on determining the one or more errors associated with the first data.

In some examples of the method 600 and the apparatus described herein, adjusting the first rate of performing the media management operation to the second rate may be based on receiving the second read command for the first data.

In some examples of the method 600 and the apparatus described herein, adjusting the first rate of performing the media management operation to the second rate occurs after receiving a threshold quantity of second read commands for the first data.

Some examples of the method 600 and the apparatus described herein may further include operations, features, means, or instructions for identifying a size of the first block of memory cells, determining a quantity of write operations performed on the first block of memory cells, and determining a quantity of available memory cells in the first block of memory cells based on identifying the size of the first block and determining the quantity of write operations performed on the first block, where adjusting the first rate of performing the media management operation to the second rate may be based on the quantity of available memory cells in the first block.

Some examples of the method 600 and the apparatus described herein may further include operations, features, means, or instructions for determining a quantity of erase operations performed on first block of memory cells, where adjusting the first rate of performing the media management operation to the second rate may be based on the quantity of erase operations performed on the first block.

In some examples of the method 600 and the apparatus described herein, the first rate of performing the media management operation may be greater than the second rate of performing the media management operation.

Some examples of the method 600 and the apparatus described herein may further include operations, features, means, or instructions for receiving a read command for a first SLCs of the set of SLCs, reading the first SLC based on receiving the read command, writing data from the first SLC to a first TLC based on reading the first SLC, and erasing the first SLC based on writing the data from the first SLC to the first TLC.

Figure 7:
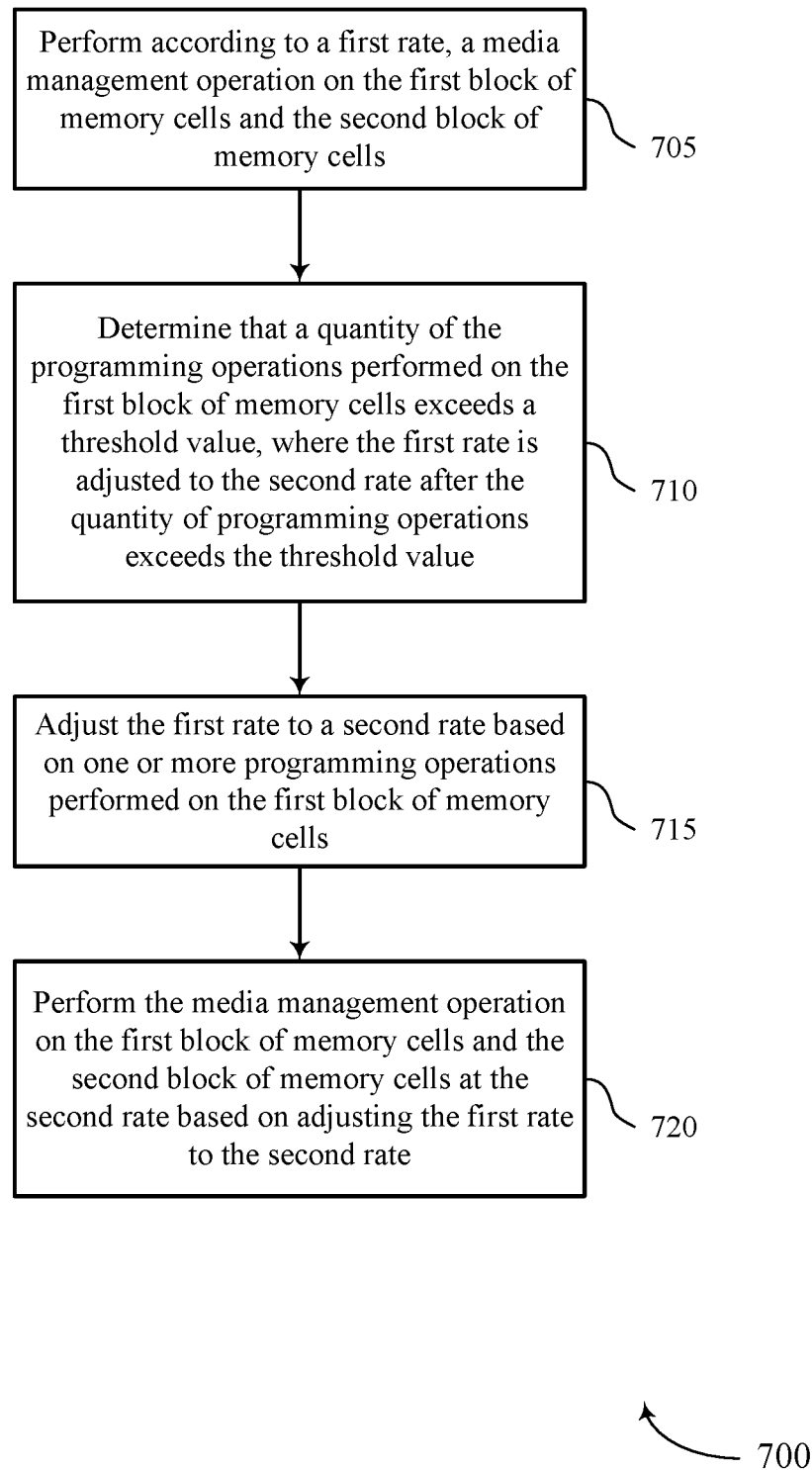

FIG. 7 shows a flowchart illustrating a method or methods 700 that supports adjustable media management in accordance with aspects of the present disclosure. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may perform according to a first rate, a media management operation on the first block of memory cells and the second block of memory cells. The operations of 705 may be performed according to the methods described herein. In some examples, aspects of the operations of 705 may be performed by a performing component as described with reference to FIG. 5.

At 710, the memory device may determine that a quantity of the programming operations performed on the first block of memory cells exceeds a threshold value, where the first rate is adjusted to the second rate after the quantity of programming operations exceeds the threshold value. The operations of 710 may be performed according to the methods described herein. In some examples, aspects of the operations of 710 may be performed by a determination component as described with reference to FIG. 5.

At 715, the memory device may adjust the first rate to a second rate based on one or more programming operations performed on the first block of memory cells. The operations of 715 may be performed according to the methods described herein. In some examples, aspects of the operations of 715 may be performed by an adjusting component as described with reference to FIG. 5.

At 720, the memory device may perform the media management operation on the first block of memory cells and the second block of memory cells at the second rate based on adjusting the first rate to the second rate. The operations of 720 may be performed according to the methods described herein. In some examples, aspects of the operations of 720 may be performed by a performing component as described with reference to FIG. 5.

Figure 8:
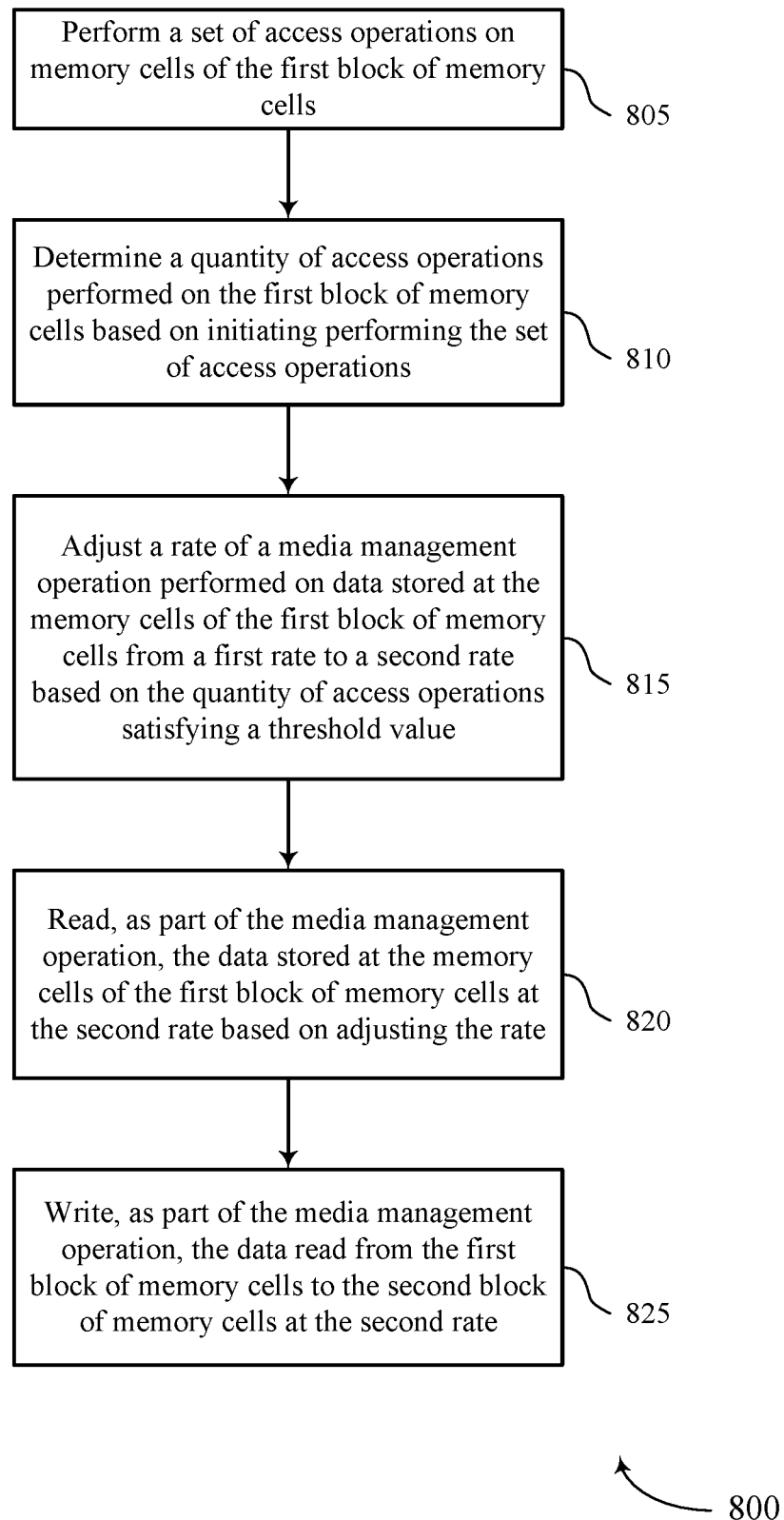

FIG. 8 shows a flowchart illustrating a method or methods 800 that supports adjustable media management in accordance with aspects of the present disclosure. The operations of method 800 may be implemented by a memory device or its components as described herein. For example, the operations of method 800 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 805, the memory device may perform a set of access operations on memory cells of the first block of memory cells. The operations of 805 may be performed according to the methods described herein. In some examples, aspects of the operations of 805 may be performed by a performing component as described with reference to FIG. 5.

At 810, the memory device may determine a quantity of access operations performed on the first block of memory cells based on initiating performing the set of access operations. The operations of 810 may be performed according to the methods described herein. In some examples, aspects of the operations of 810 may be performed by a determination component as described with reference to FIG. 5.

At 815, the memory device may adjust a rate of a media management operation performed on data stored at the memory cells of the first block of memory cells from a first rate to a second rate based on the quantity of access operations satisfying a threshold value. The operations of 815 may be performed according to the methods described herein. In some examples, aspects of the operations of 815 may be performed by an adjusting component as described with reference to FIG. 5.

At 820, the memory device may read, as part of the media management operation, the data stored at the memory cells of the first block of memory cells at the second rate based on adjusting the rate. The operations of 820 may be performed according to the methods described herein. In some examples, aspects of the operations of 820 may be performed by an accessing component as described with reference to FIG. 5.

At 825, the memory device may write, as part of the media management operation, the data read from the first block of memory cells to the second block of memory cells at the second rate. The operations of 825 may be performed according to the methods described herein. In some examples, aspects of the operations of 825 may be performed by an accessing component as described with reference to FIG. 5.

In some examples, an apparatus as described herein may perform a method or methods, such as the method 800. The apparatus may include features, means, or instructions (e.g., a non-transitory computer-readable medium storing instructions executable by a processor) for performing a set of access operations on memory cells of the first block of memory cells, determining a quantity of access operations performed on the first block of memory cells based on initiating performing the set of access operations, adjusting a rate of a media management operation performed on data stored at the memory cells of the first block of memory cells from a first rate to a second rate based on the quantity of access operations satisfying a threshold value, reading, as part of the media management operation, the data stored at the memory cells of the first block of memory cells at the second rate based on adjusting the rate, and writing, as part of the media management operation, the data read from the first block of memory cells to the second block of memory cells at the second rate.

Some examples of the method 800 and the apparatus described herein may further include operations, features, means, or instructions for reading, as part of the media management operation, the data stored at the memory cells of the first block of memory cells at the first rate based on initiating performing the set of access operations, and writing, as part of the media management operation, the data read from the first block of memory cells to the second block of memory cells at the first rate before adjusting the rate of the media management operation from the first rate to the second rate.

Some examples of the method 800 and the apparatus described herein may further include operations, features, means, or instructions for determining that an access operation may have not been performed on any memory cells of the first block for a threshold duration, where adjusting the rate of the media management operation from the first rate to the second rate occurs based on the threshold duration being satisfied.

Some examples of the method 800 and the apparatus described herein may further include operations, features, means, or instructions for erasing, as part of the media management operation, the data read from the first block of memory cells at the second rate based on writing the data to the second block of memory cells.

Figure 9:
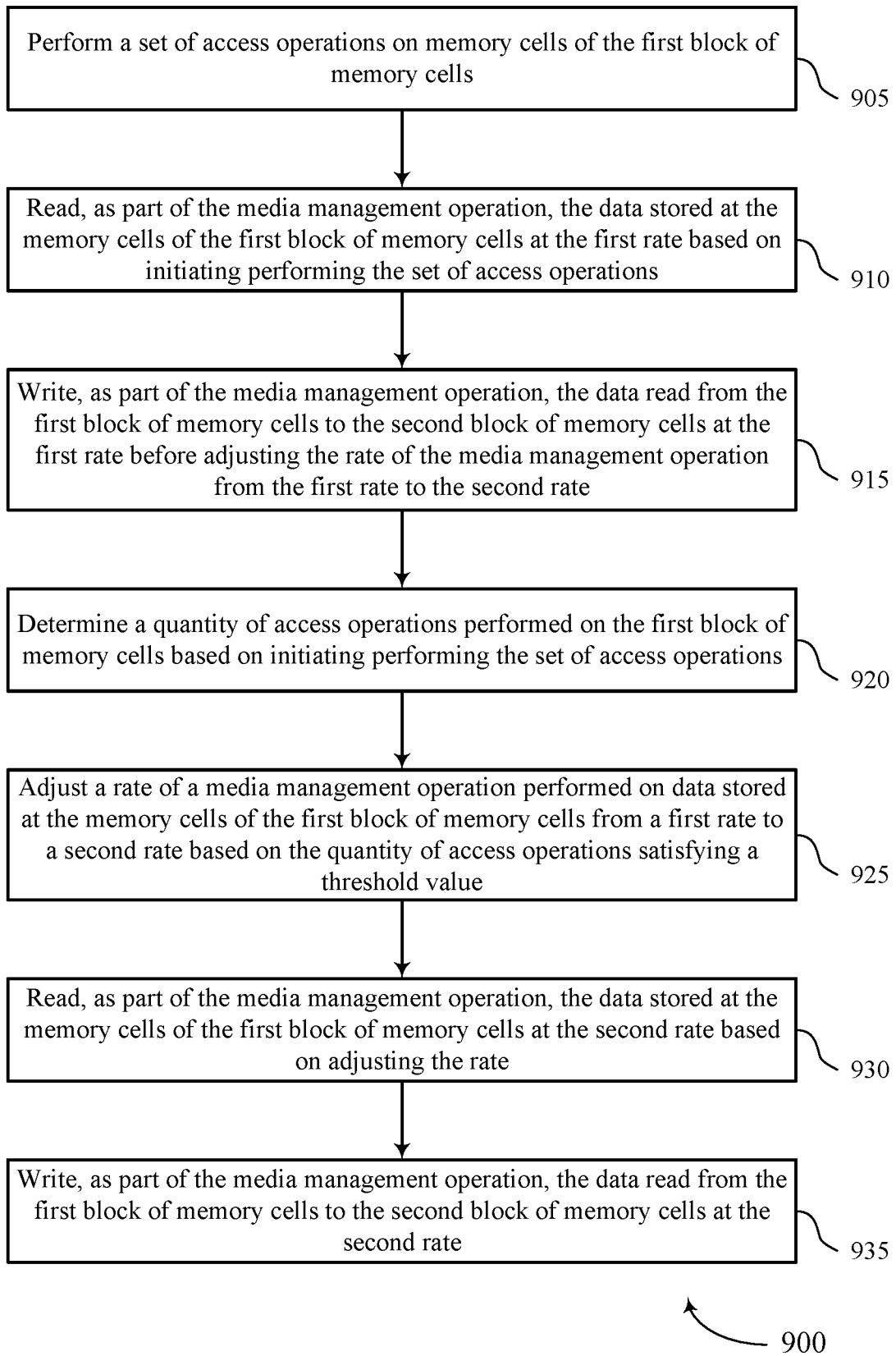

FIG. 9 shows a flowchart illustrating a method or methods 900 that supports adjustable media management in accordance with aspects of the present disclosure. The operations of method 900 may be implemented by a memory device or its components as described herein. For example, the operations of method 900 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 905, the memory device may perform a set of access operations on memory cells of the first block of memory cells. The operations of 905 may be performed according to the methods described herein. In some examples, aspects of the operations of 905 may be performed by a performing component as described with reference to FIG. 5.

At 910, the memory device may read, as part of the media management operation, the data stored at the memory cells of the first block of memory cells at the first rate based on initiating performing the set of access operations. The operations of 910 may be performed according to the methods described herein. In some examples, aspects of the operations of 910 may be performed by an accessing component as described with reference to FIG. 5.

At 915, the memory device may write, as part of the media management operation, the data read from the first block of memory cells to the second block of memory cells at the first rate before adjusting the rate of the media management operation from the first rate to the second rate. The operations of 915 may be performed according to the methods described herein. In some examples, aspects of the operations of 915 may be performed by an accessing component as described with reference to FIG. 5.

At 920, the memory device may determine a quantity of access operations performed on the first block of memory cells based on initiating performing the set of access operations. The operations of 920 may be performed according to the methods described herein. In some examples, aspects of the operations of 920 may be performed by a determination component as described with reference to FIG. 5.

At 925, the memory device may adjust a rate of a media management operation performed on data stored at the memory cells of the first block of memory cells from a first rate to a second rate based on the quantity of access operations satisfying a threshold value. The operations of 925 may be performed according to the methods described herein. In some examples, aspects of the operations of 925 may be performed by an adjusting component as described with reference to FIG. 5.

At 930, the memory device may read, as part of the media management operation, the data stored at the memory cells of the first block of memory cells at the second rate based on adjusting the rate. The operations of 930 may be performed according to the methods described herein. In some examples, aspects of the operations of 930 may be performed by an accessing component as described with reference to FIG. 5.

At 935, the memory device may write, as part of the media management operation, the data read from the first block of memory cells to the second block of memory cells at the second rate. The operations of 935 may be performed according to the methods described herein. In some examples, aspects of the operations of 935 may be performed by an accessing component as described with reference to FIG. 5.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory component including a first block of memory cells and a second block of memory cells, a media management component coupled with the memory component and configured to perform a media management operation on the first block of memory cells and the second block of memory cells at a variable rate, and a memory health component coupled with the media management component and configured to adjust the variable rate of the media management operation from a first rate to a second rate based on a one or more programming operations performed on the first block of memory cells.

Some examples of the apparatus may include a counter coupled with the memory component and the memory health component and configured to track a duration that the first block of memory cells in in an idle state, where the memory health component may be configured to adjust the variable rate of the media management operation from the first rate to the second rate after the first block of memory cells may have been idle for a threshold duration.

In some examples, the memory health component may include operations, features, means, or instructions for a counter configured to track a quantity of access operations performed on the first block of memory cells, where the memory health component may be configured to adjust the variable rate of the media management operation from the first rate to the second rate based on the quantity satisfying a threshold value.

In some examples, the memory health component may include operations, features, means, or instructions for a cache size component configured to determine a quantity of memory cells in the first block that may be available based on the quantity of access operations performed on the first block of memory cells, where the memory health component may be configured to adjust the variable rate of the media management operation from the first rate to the second rate based on the quantity of available memory cells falling below a threshold value.

In some examples, the memory health component may include operations, features, means, or instructions for an error determination component configured to determine a quantity of errors associated with data of the first block of memory cells, where the memory health component may be configured to adjust the variable rate of the media management operation from the first rate to the second rate based on an occurrence of a quantity of errors satisfying a threshold value.

In some examples, the memory health component may include operations, features, means, or instructions for a read retry component configured to.

In some examples, the second rate of performing the media management operation may be lesser than the first rate of performing the media management operation.

In some examples, the first block of memory cells includes a set of single level cells (SLCs) and the second block of memory cells includes a set of tri-level cells (TLCs).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
    a first block of memory cells;
    a second block of memory cells; and
    a controller coupled with the first block of memory cells and the second block of memory cells, wherein the controller is operable to cause the apparatus to:
        perform, according to a first rate, a media management operation on the first block of memory cells and the second block of memory cells, wherein the first rate is based at least in part on one or more conditions of one or more of the first block of memory cells and the second block of memory cells;
        determine a quantity of available memory cells in the first block of memory cells based at least in part on a size of the first block and a quantity of write operations performed on the first block;

adjust the first rate to a second rate based at least in part on the quantity of available memory cells in the first block; and perform the media management operation on the first block of memory cells and the second block of memory cells at the second rate based at least in part on adjusting the first rate to the second rate.

2. The apparatus of claim 1, wherein the controller is operable to cause the apparatus to:

determine that the quantity of write operations performed on the first block of memory cells exceeds a threshold value, wherein the first rate is adjusted to the second rate after the quantity of write operations exceeds the threshold value.

3. The apparatus of claim 1, wherein the controller is operable to cause the apparatus to:

receive a first plurality of write commands for writing data to the first block of memory cells for a first duration; and determine that at least the first block of memory cells is in an idle state based at least in part on an absence of commands for the first block of memory cells over a second duration, wherein adjusting the first rate of performing the media management operation to the second rate occurs based at least in part on at least the first block of memory cells operating in the idle state for a threshold duration.

4. The apparatus of claim 1, wherein the controller is operable to cause the apparatus to:

receive a second plurality of write commands after adjusting the first rate of performing the media management operation to the second rate;

determine that a quantity of the second plurality of write commands exceeds a second threshold value; and adjust the second rate of performing the media management operation to a third rate based at least in part on the second plurality of write commands exceeding the second threshold value.

5. The apparatus of claim 1, wherein the controller is operable to cause the apparatus to:

receive a first read command for at least one memory cell of the first block of memory cells or the second block of memory cells when performing the media management operation at the first rate;

determine one or more errors associated with first data based at least in part on receiving the first read command; and receive a second read command for the first data stored at the first block of memory cells based at least in part on determining the one or more errors associated with the first data.

6. The apparatus of claim 5, wherein the controller is operable to cause the apparatus to:

adjust the first rate of performing the media management operation to the second rate is based at least in part on receiving the second read command for the first data.

7. The apparatus of claim 1, wherein the controller is operable to cause the apparatus to:

identify the size of the first block of memory cells; and
determine the quantity of write operations performed on at least the first block of memory cells.

8. The apparatus of claim 1, wherein the controller is operable to cause the apparatus to:

identify a size of the second block of memory cells;
determine a quantity of write operations performed on at least the second block of memory cells; and determine a quantity of available memory cells in the second block of memory cells based at least in part on identifying the size of the second block and determining the quantity of write operations performed on the second block, wherein adjusting the first rate of performing the media management operation to the second rate is based at least in part on the quantity of available memory cells in the second block.

9. The apparatus of claim 1, wherein the controller is operable to cause the apparatus to:

determine a quantity of erase operations performed on at least the first block of memory cells, wherein adjusting the first rate of performing the media management operation to the second rate is based at least in part on the quantity of erase operations performed on the first block.

10. The apparatus of claim 1, wherein the first rate of performing the media management operation is greater than the second rate of performing the media management operation.

11. The apparatus of claim 1, wherein the first block of memory cells comprises a plurality of single level cells (SLCs) and the second block of memory cells comprises a plurality of multi-level cells (MLCs).

12. The apparatus of claim 11, wherein the controller is operable to cause the apparatus to:

receive a read command for a first SLC of the plurality of SLCs;

initiate reading the first SLC based at least in part on receiving the read command;

initiate writing data from the first SLC to a first tri-level cell (TLC) based at least in part on reading the first SLC; and initiate erasing the first SLC based at least in part on writing the data from the first SLC to the first TLC.

13. An apparatus, comprising:

a memory component comprising a first block of memory cells and a second block of memory cells;

a media management component coupled with the memory component and configured to perform a media management operation on the first block of memory cells and the second block of memory cells at a variable rate; and a memory health component coupled with the media management component and configured to determine a quantity of available memory cells in the first block of memory cells based at least in part on a size of the first block and a quantity of write operations performed on the first block and adjust the variable rate of the media management operation from a first rate to a second rate based at least in part on the quantity of available memory cells in the first block, wherein the first rate is based at least in part on one or more conditions of one or more of the first block of memory cells and the second block of memory cells.

14. The apparatus of claim 13, further comprising:

a counter coupled with the memory component and the memory health component and configured to track a duration since the memory component received an access command, wherein the memory health component is configured to adjust the variable rate of the media management operation from the first rate to the second rate based on the duration since the memory component received the access command satisfying a threshold duration.

15. The apparatus of claim 13, wherein the memory health component comprises a counter configured to track a quantity of access operations performed on the first block of memory cells or the second block of memory cells, wherein the memory health component is configured to adjust the variable rate of the media management operation from the first rate to the second rate based at least in part on the quantity satisfying a threshold value.

16. The apparatus of claim 15, wherein the memory health component comprises a cache size component configured to determine the quantity of available memory cells in the first block that are available based on the quantity of access operations performed on the first block of memory cells and a quantity of memory cells in the second block that are available based on the quantity of access operations performed on the second block of memory cells.

17. The apparatus of claim 13, wherein the memory health component comprises an error determination component configured to determine a quantity of errors associated with data of the first block of memory cells or data of the second block of memory cells, wherein the memory health component is configured to adjust the variable rate of the media management operation from the first rate to the second rate based at least in part on an occurrence of the quantity of errors satisfying a threshold value.

18. The apparatus of claim 13, wherein the memory health component comprises a read retry component configured to:
  initiate a first read operation for at least one memory cell of the first block of memory cells or the second block of memory cells when the media management component is performing the media management operation at the first rate;
  determine one or more errors associated with first data based at least in part on initiating the first read operation; and
  initiate a second read operation for the first data stored at the first block of memory cells based at least in part on determining the one or more errors associated with the first data.

19. The apparatus of claim 13, wherein the second rate of performing the media management operation is lesser than the first rate of performing the media management operation.

20. The apparatus of claim 13, wherein the first block of memory cells comprises a plurality of single level cells (SLCs) and the second block of memory cells comprises a plurality of tri-level cells (TLCs) or a plurality of quad-level cells (QLCs).

21. An apparatus, comprising:
  a first block of memory cells;
  a second block of memory cells; and
  a controller coupled with the first block of memory cells and the second block of memory cells, wherein the controller is operable to:
    initiate performing a plurality of access operations on memory cells of the first block of memory cells;
    determine a quantity of access operations performed on the first block of memory cells based at least in part on initiating performing the plurality of access operations;
    determine a quantity of available memory cells in the first block of memory cells based at least in part on a size of the first block and the quantity of access operations performed on the first block based at least in part on determining the quantity of access operations;
    adjust a rate of a media management operation performed on data stored at the memory cells of the first block of memory cells from a first rate to a second rate based at least in part on the quantity of available memory cells in the first block, wherein the first rate is based at least in part on one or more conditions of one or more of the first block of memory cells and the second block of memory cells;
    initiate reading, as part of the media management operation, the data stored at the memory cells of the first block of memory cells at the second rate based at least in part on adjusting the rate; and
    initiate writing, as part of the media management operation, the data read from the first block of memory cells to the second block of memory cells at the second rate.

22. The apparatus of claim 21, wherein the controller is operable to cause the apparatus to:
  initiate reading, as part of the media management operation, the data stored at the memory cells of the first block of memory cells at the first rate based at least in part on initiating performing the plurality of access operations; and
  initiate writing, as part of the media management operation, the data read from the first block of memory cells to the second block of memory cells at the first rate before adjusting the rate of the media management operation from the first rate to the second rate.

23. The apparatus of claim 21, wherein the controller is operable to cause the apparatus to:
  determine that an access operation has not been performed on any memory cells of the first block for a threshold duration, wherein adjusting the rate of the media management operation from the first rate to the second rate occurs based at least in part on the threshold duration being satisfied.

24. The apparatus of claim 21, wherein the controller is operable to cause the apparatus to:
  initiate erasing, as part of the media management operation, the data read from the first block of memory cells at the second rate based at least in part on writing the data to the second block of memory cells.

25. The apparatus of claim 21, wherein the first block of memory cells comprises a plurality of single level cells (SLCs) and the second block of memory cells comprises a plurality of multi-level cells (MLCs).

* * * * *